United States Patent [19]

Hough

[11] 4,007,842
[45] * Feb. 15, 1977

[54] ROTARY GRAIN DISTRIBUTOR

[76] Inventor: Richard Murray Hough, Sunfield, Mich. 48890

[ * ] Notice: The portion of the term of this patent subsequent to Aug. 6, 1991, has been disclaimed.

[22] Filed: July 23, 1975

[21] Appl. No.: 598,368

[52] U.S. Cl. .............................. 214/16 R; 74/128; 193/23; 302/28

[51] Int. Cl.² ..................................... B65G 65/00

[58] Field of Search ................... 214/17 CB, 16 R; 193/23, 29, 31 R, 31 A; 74/128; 302/27, 28, 34

[56] References Cited

UNITED STATES PATENTS

| | | | |
|---|---|---|---|
| 2,660,895 | 12/1953 | Waters | 74/128 |
| 2,756,859 | 7/1956 | Steffen et al. | 193/23 |
| 2,947,187 | 8/1960 | Graff et al. | 74/128 |
| 3,255,857 | 6/1966 | Armstrong et al. | 193/23 |
| 3,827,578 | 8/1974 | Hough | 193/23 |
| 3,874,490 | 4/1975 | McAlister | 193/23 |

Primary Examiner—Evon C. Blunk
Assistant Examiner—Jeffrey V. Nase
Attorney, Agent, or Firm—Price, Heneveld, Huizenga & Cooper

[57] ABSTRACT

A rotary grain distribution system includes a distributor having a grain filling chute and an air exhausting chute rotatably positioned within a housing and each terminating at one end in an annular cover and indexing ring. The indexing ring is positioned in proximity with the open ends of a plurality of chutes extending from the lower end of the distributor to grain storage bins below for selectively coupling the grain filling and exhaust chutes to one of a plurality of storage bins while sealing off the remaining bins. A ratchet and pawl drive mechanism coupled between the housing and the indexing ring provides a positive drive for accurately aligning the indexing ring and grain and exhaust chutes to the chutes extending to the storage bins. A cyclone precipitator has an intake coupled to the exhausting chute for evacuating air from a grain bin as it is being filled and collecting and returning the particulate matter to the supply of grain.

6 Claims, 6 Drawing Figures

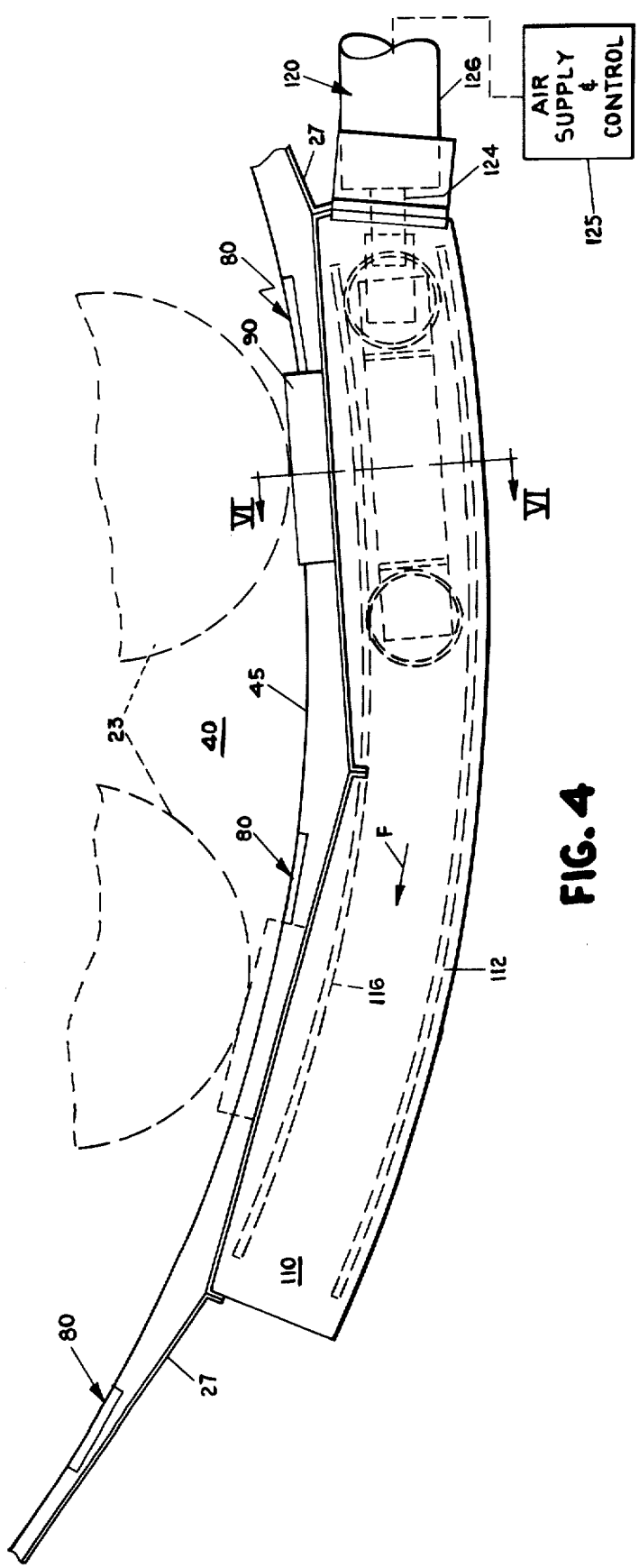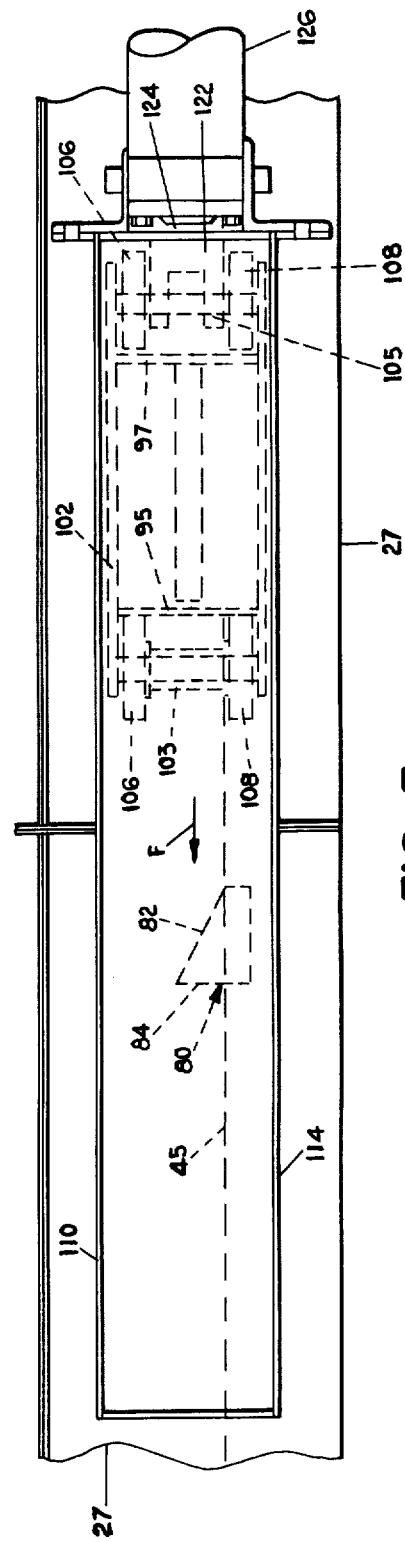

ROTARY GRAIN DISTRIBUTOR

BACKGROUND OF THE INVENTION

The present invention relates to a rotary grain distribution system and specifically to an improved system for coupling the distributor to one of the storage bins.

In recent years, the use of rotary grain distribution systems for separating grain into a plurality of storage bins for storage and shipment has become increasingly popular. In a rotary system, a single distributor is employed to fill many storage bins positioned in a ring below the distributor. Such a system not only reduces the total area required for the system, but also increases the bin filling efficiency by being capable of switching from one bin to another relatively rapidly.

In order to operate the rotary distribution system at a relatively high grain flow rate, an improved method and apparatus for evacuating bins as they are being filled has been devised and is disclosed in U.S. Pat. No. 3,827,578 issued Aug. 6, 1974 to R. M. Hough. In the system described in this patent, the rotary distributor selectively couples a source of grain to the grain filling chute associated with the storage bin by means of a grain filling chute and also evacuates air from the bin as it is being filled by employing a blower which draws air through an exhaust chute coupling the storage bin to the distributor. In such a system, a sliding seal in the form of an arcuate segment is employed for sealing the lower end of the distributor filling and evacuating chutes to the particular bin desired. The remaining bins are in continuous communication with one another through the interior of the rotary distributor. In the system, the distributor is driven by a chain and sprocket arrangement for aligning the distributor filling and evacuating chutes with those of the desired bin. Also in such system, a cyclone precipitator is mounted above the distributor for separating particulate material from the evacuated air and returning it to the grain filling stream.

Although the system described in the above patent represents a significant advancement in the art of rotary grain distributing systems, the direct communication of the grain storage bins through the housing is undesirable inasmuch as it permits the transmission of a dust explosion between bins should such an explosion occur in one of the bins. Additionally, the drive system, although adequate for most purposes, does not assure exact alignment of the filling and evacuation chutes of the distributor with those of the desired storage bin.

SUMMARY OF THE INVENTION

Accordingly, in order to overcome the shortcomings of the prior art including that of the above mentioned patent, the system of the present invention employs an indexing ring which serves the dual function of providing a continuous sealing cover for the storage bins at the distributor while simultaneously serving as means for accurately indexing the alignment of the distributor filling and evacuating chutes with a selected pair of chutes associated with a bin to be filled. Additionally, in the preferred embodiment, the evacuating chute extends downwardly through the floor of the distributor and communicates with the cyclone precipitator mounted below the distributor to facilitate removal of particulate material and subsequent return of such material to the filling stream.

With the improved system, therefore, the potential hazard of transmission of a dust explosion from one bin to another is virtually eliminated and accurate alignment of the filling and evacuating chutes with the desired storage bin is assured.

Also, the positioning of the cyclone precipitator provides a more compact installation as well as more efficient gathering of particulate material from the evacuation stream.

These and other advantages, objects and purposes of the present invention can best be understood by reference to the following description thereof together with the accompanying drawings in which:

BRIEF DESCRIPTION OF THE DRAWINGS

FIG. 4 is a greatly enlarged, fragmentary plan view of the improved drive means associated with the cover and indexing ring seen in FIG. 3;

FIG. 5 is a front elevation of the structure shown in FIG. 4 shown partly in phantom form.

DETAILED DESCRIPTION OF THE PREFERRED EMBODIMENT

Figure 1:
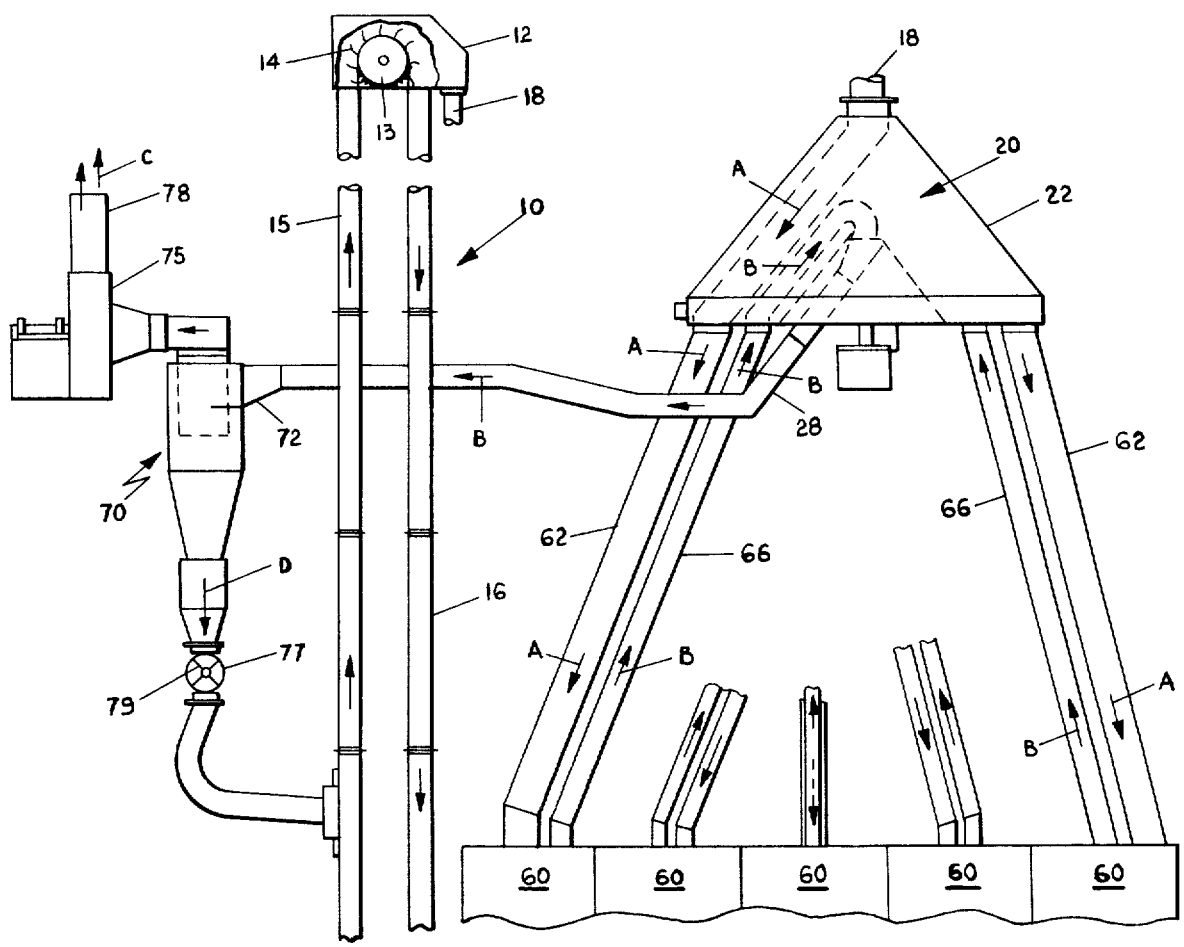
FIG. 1 is a fragmentary side elevational view, partly broken away, of the grain distribution system.
Figure 2:
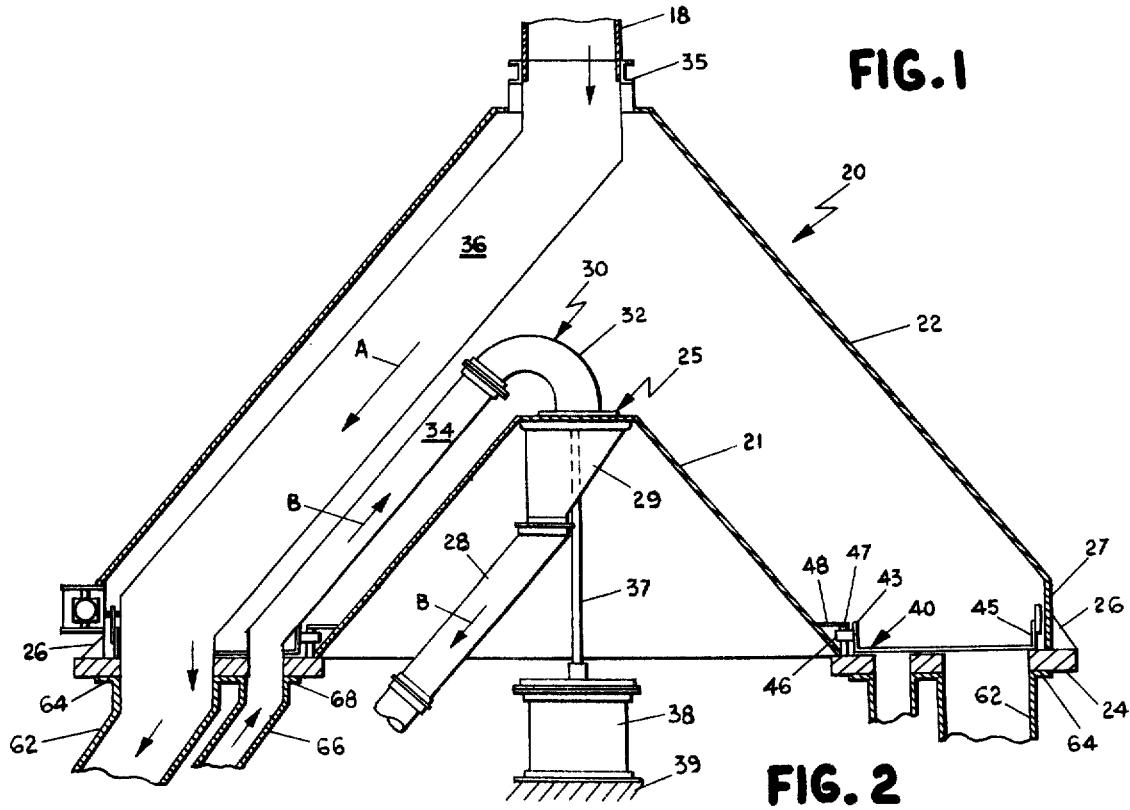
FIG. 2 is an enlarged, fragmentary cross-sectional view of the improved rotary distributor.

Referring now to FIGS. 1 and 2, there is shown the preferred embodiment which includes a grain elevator 10 which applies grain to a rotary grain distributor 20 which in turn selectively distributes the grain among a plurality of storage bins 60 arranged in a ring below the distributor. The grain elevator includes an elevated housing 12 supported by suitable structure (not shown). The housing includes therein a rotary wheel 13 supporting one end of an endless loop bucket conveyor 14. Conveyor 14 operates to bring grain up and enclosed input leg 15 which communicates with a supply of grain and returns the empty conveyor buckets through an enclosed return leg 16 of the elevator. A discharge chute 18 communicates with the floor of the housing to transport grain from the conveyor 14 to the rotary distributor 20. In the drawing, the grain filling direction is indicated by arrows A while the air evacuation direction is indicated by arrows B.

The distributor 20 comprises an outer conical body 22 of sheet or plate material which is joined to a vertically extending, cylindrical side wall segment 27 sealed at the bottom to annular floor plate 24 by means of a mounting bracket 26 (FIG. 2) or other suitable means. The distributor body also includes an inner conical wall 21 concentrically spaced inside wall 22 and supported by floor 24 by suitable brackets (not shown) forming a sealed coupling at the bottom of wall 21 to floor 24. The bottom of the conical wall 21 is open while the top terminates in a circular rotary seal 25. Seal 25 provides an intercoupling between the stationary exhaust outlet 28 coupled thereto by means of a funnel-like sheet metal coupling 29 and a rotary exhaust chute 30 within the distributor. Chute 30 includes a curved elbow 32 coupled to the seal 25 and a generally straight section 34 which terminates in an annular cover and indexing ring 40.

Exhaust outlet 28 is sealably coupled to the intake 72 of a cyclone precipitator 70. An electrical blower 75 draws the air and particulate material from the storage bin through the distributor system and the precipitator 70 and exhausts the air through an exhaust outlet 78 as indicated by arrow C (FIG. 1). The precipitate material collected by the cyclone precipitator is returned to the distributor 20 as indicated by arrow D in FIG. 1 by means of a rotary dump valve 77 having a plurality of vanes 79 which effectively seal the negative pressure space in the precipitator and in the evacuation chutes from the grain input chute 18 to provide a closed loop return system for the grain without disrupting the evacuation of air from bins being filled by the distributor.

The upper end of outer wall 22 terminates in a slip fit coupling 35 which couples the stationary filler chute 18 from the storage bin to the rotary filling chute 36 associated with the distributor and which is permitted to rotate with respect to wall 22 at the upper end by virtue of coupling 35. Chute 36 terminates at its lower end at ring 40 as described in greater detail below. The rotatable filling and exhaust chutes 36 and 30, respectively, and the associated rotating indexing ring 40 are supported for rotation with respect to the fixed distributor shell consisting of walls 21 and 22 by means of a bearing assembly 38 mounted on a suitable support stanchion, shown schematically as 39 in FIG. 2, and a vertically extending support shaft 37 coupled to rotary coupling 25 for supporting chutes 30 and 36 together with ring 40. Floor plate 24 of the distributor is supported by a stationary support platform (not shown) and spaced above the storage bins 60.

Figure 3:
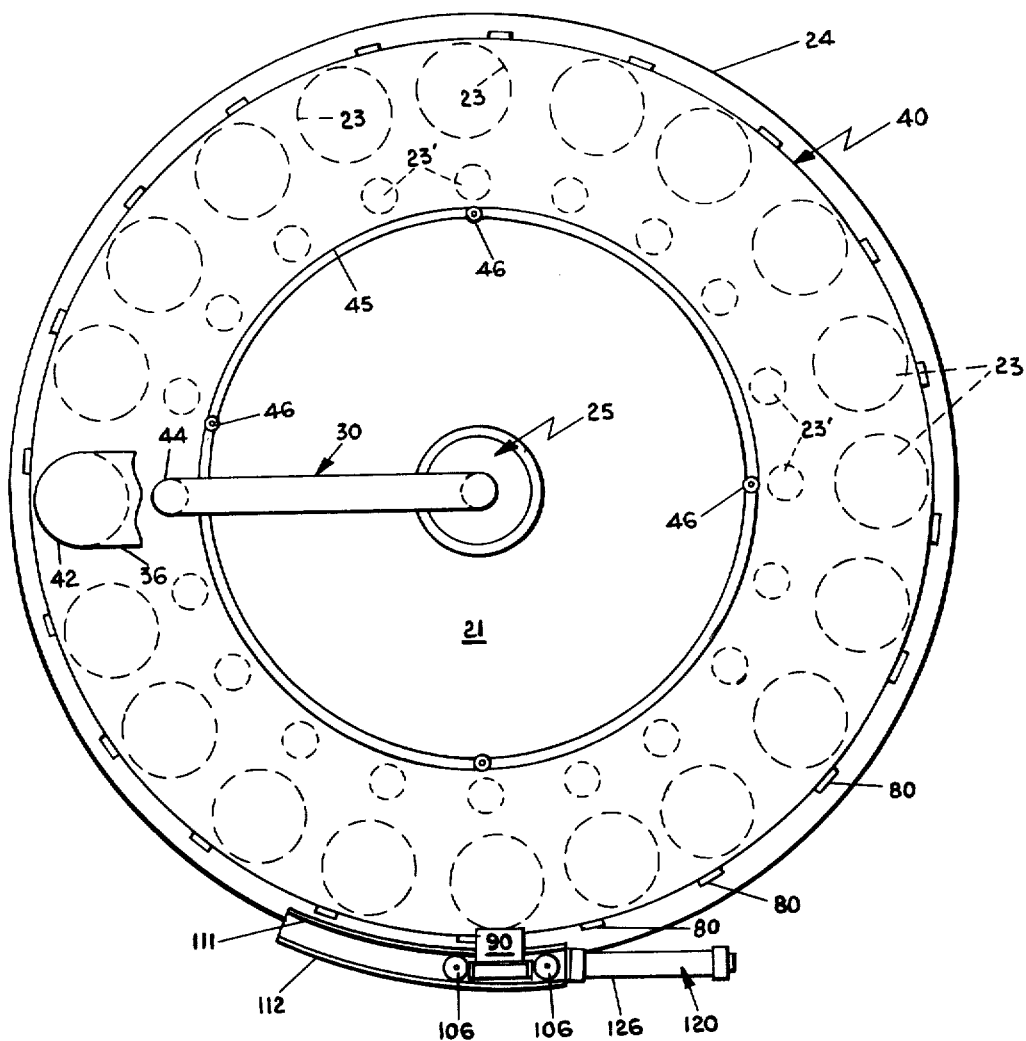
FIg. 3 is an enlarged top plan view of the interior of the distributor floor.

The construction of the floor plate 24 and ring 40 is best seen in FIG. 3 which shows the support floor 24 which includes a plurality of exhaust chute openings 23 annularly spaced on a common radius around the floor 24 and to which there is mounted a plurality of bin filling chutes 62 by flange means 64 (FIG. 2). Plate 24 further includes a plurality of smaller diameter evacuation chute apertures 23' formed in an annular ring having a radius smaller than that of the filling chute apertures 23. Exhaust chutes 66 for the bins are coupled to floor 24 in alignment with apertures 23' by means of flanges 68. In the preferred embodiment, the ring included 20 pairs of such apertures for permitting the distributor to serve 20 storage bins.

As seen in FIG. 3, the indexing ring and cover plate 40 has inner and outer diameters such that each of the pairs of apertures 23, 23' are effectively sealed with the exception of the pair aligned with the filling chute 36 and exhaust chute 30 where the ring 40 includes an aperture 42 which is aligned with the lower end of filling chute 36 and an aperture 44 which is aligned with the lower end of segment 34 of exhaust chute 30 as best seen in FIG. 2.

The annular sealing plate 40 includes an inner, upstanding cylindrical shoulder 43 and an outer, upstanding cylindrical shoulder 45 utilized in conjunction with the drive means as explained in detail below.

Supporting the inner shoulder 43 of the annular ring 40 is a plurality of spaced rollers 46 which, as best seen in FIG. 2, are mounted on a vertically extending axle 47 in turn secured to the inner conical housing 21 by means of bracket 48. Thus, the annular cover and indexing ring 40 are maintained in proper registration with respect to plate 24 during its rotation with respect thereto. In order to provide accurate registration and alignment of apertures 42 and 44 in the cover and indexing ring 40 with respect to preselected pairs of apertures 23 and 23' in the floor plate 24, a unique stepwise drive means is provided and is now described.

Positioned at spaced intervals around the periphery near the rim of shoulder 45 of the annular indexing and cover ring 40 is a plurality of ratchet bars 80 which, as best seen in FIG. 5, include a tapered leading edge 82 permitting a pivoted pawl 90 associated with the drive means to ride over the leading edge and capture the ratchet bar on the trailing edge 84 as the pawl is returned from left to right as seen in FIG. 5. The drive means for the pivoted pawl 90 is mounted externally to the distributor on outer walls 27 of the distributor which includes a slot 27' therein permitting the pawl 90 to extend into the distributor and selectively engage one of the ratchet bars 80 for rotation of the chutes 30 and 36 as well as indexing ring and cover 40.

The ratchet bars 80 are positioned in the same angular spaced relationship as are aperture pairs 23, 23' formed in the floor 24 of the distributor and are moved by the drive means an incremental distance corresponding to the arcuate distance between these pairs of apertures such that for each stroke of pawl 90, the distributor chutes 30 and 36 are moved from one pair of apertures corresponding to onset bin filling and evacuation chutes 62, 66, respectively, to the adjacent pair in a counterclockwise fashion as viewed from the top.

Figure 6:
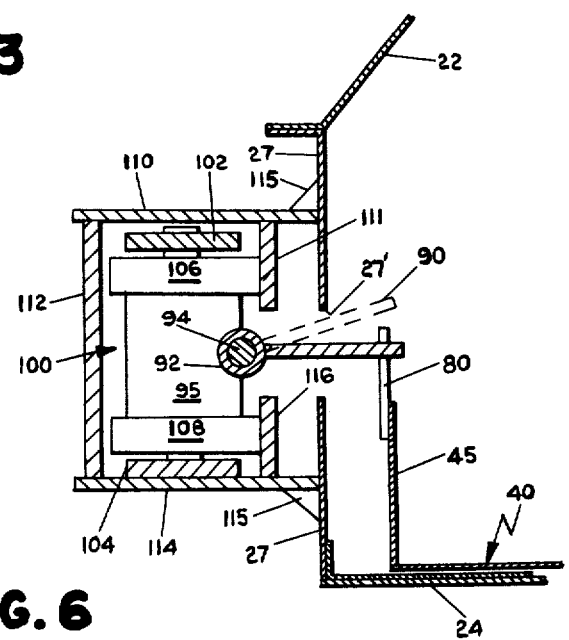
FIG. 6 is a cross-sectional view of a portion of the drive means taken along section lines VI-VI of FIG. 4.

The pawl 90 is pivotally coupled in a carriage assembly 100 by means of a collar 92 surrounding a horizontally extending pivot rod 94 mounted between a pair of spaced, vertical end plates 95 and 97 as seen in FIGS. 5 and 6. This arrangement permits pivoting from a generally horizontal position as seen in FIG. 6 in solid lines to a position which permits it to clear the tip of each ratchet bar 80 as shown in phantom lines in FIG. 6 during the return stroke of the ratchet drive mechanism as described below. The carriage assembly includes upper and lower roller frame members 102 and 104, respectively, which support at opposite ends thereof axles 103 and 105 on each of which there is positioned an upper and lower roller 106 and 108, respectively, providing horizontal support for the carriage assembly in its travel through an exterior housing consisting of an upper horizontal plate 110, an outer wall 112 and a lower horizontal plate 114 which are coupled as shown in FIG. 6. The upper and lower horizontal plates 110, 114 are suitably joined to the outer wall 27 of the distributor spaced on opposite sides of slot 27' therein by suitable mounting brackets 115. Upper bracket 110 includes a downwardly extending roller guide 111 extending partially downwardly therein while lower plate 114 includes an upwardly extending roller guide 116.

As best seen in FIG. 4, the outer roller guide 112 and each of the inner roller guides 111 and 116 are generally arcuate shaped providing a path of travel for carriage assembly 100 immediately adjacent the exterior wall 27 of the distributor such that pawl 90 extends continuously into the distributor in a position to successively engage ratchet bars 80 as the carriage assembly is advanced in a direction indicated by arrow F in FIGS. 4 and 5 and retracted in a direction opposite arrow F.

Carriage assembly 100 is coupled to a pneumatic drive cylinder 120 which includes a shaft 124 coupled to clevis 122 (FIG. 5) and a body 126 which is secured in stationary relationship to the exterior wall 27 of the distributor by suitable bracket means (not shown).

Clevis 122 surrounds axle 105 also used to support a pair of rollers 106 and 108 on the cylinder of carriage assembly 100. Cylinder 120 is controlled by means of a throttling valve (not shown) and has a stroke sufficient to advance carriage 100 and the pivoted pawl 90 thereon slightly beyond each of the ratchet bars 80 during the forward stroke of the carriage such that the trailing edge of the pawl 90 engages the trailing edge 84 of the ratchet bar as the cylinder is actuated in an opposite direction for stepwise rotation of the distributor indexing ring and chutes.

The distributor system includes a conventional pneumatic control which includes a pair of limit switches (not shown) positioned to be actuated by the carriage assembly 100 at the ends of travel to control the air cylinder between its forward and retracting strokes. The control system may include counter means such that the operator can select a predetermined one of the twenty storage bins and actuate the control system such that the distributor filling chutes rotate and align with the preselected bin. Also, conventional bin level indicators can be employed to control the flow of grain into the storage bin so that once it is filled, the grain supply is momentarily interrupted until the distributor advances the filling evacuation chutes to the next bin desired to be filled. The pneumatic control and the supply of pressurized air therefor is shown in block form in FIG. 4 as block 125.

In operation, the cover and indexing ring 40 close off all of the storage bin chutes except the selected chute which is in direct communication with apertures 42 and 44 in the ring 40 by aligned apertures 23 and 23' in the floor plate 24. As grain is supplied through input chute 18 and flowing in a direction indicated by arrow A in the figures, air is simultaneously evacuated to the exhaust chute 30 within the distributor and into the cyclone precipitator 70 returning the precipitate material to the grain supply while exhausting air through blower 75. The ring 40 assures the remaining bins are sealed from one another preventing the transmission of any dust explosion which may occur. Once the bin being filled is filled to the desired level, the distributor is advanced to the next position. This is accomplished by actuating cylinder 120 to extend shaft 124 thereof to move carriage assembly 100 and the pivoted pawl 90 to the next ratchet bar 80 corresponding to the adjacent bin filling station of the distributor and actuating cylinder 120 to retract shaft 124 to return carriage 100 to the position shown in FIG. 3 rotating the indexing ring 40 in a counterclockwise direction such that apertures 42 and 44 therein associated with filling chutes 36 and evacuating chute 30 are aligned with the next bin chutes for filling of the next adjacent bin in the system. In such manner, the distributor chutes can be advanced in a stepwise fashion in precise alignment with the desired bin chutes.

It will become apparent to those skilled in the art that various modifications to the preferred embodiment shown and described herein can be made without departing from the spirit or scope of the present invention as defined by the appended claims.

The embodiments of the invention in which an exclusive property or privilege is claimed are defined as follows.

1. A rotary grain distributor comprising:
a housing including a floor, a grain inlet and a plurality of equally spaced grain outlet apertures formed in a ring around said floor;
a cover plate movably mounted to said housing for covering all but a select one of said grain outlets, said cover plate including an aperture for selective alignment with said apertures in said floor; and
a grain filling chute including an inlet end coupled to said grain inlet and an outlet end coupled to said aperture in said cover plate to communicate with said select one of said outlets whereby storage bins coupled to said grain outlets of said housing are isolated from one another by said cover plate of said distributor, and
drive means extending between said cover plate and said housing for stepwise advancement of said cover plate for coupling said filling chute to a desired one of said grain outlet apertures, said drive means including a plurality of ratchet plates positioned on said cover plate at equally spaced intervals corresponding to the angular position of said grain outlet apertures and a carriage movably coupled to said housing and including a pivoted pawl for engaging a ratchet plate for movement of said cover plate in one direction and cylinder means coupled to said carriage for advancing and retracting said carriage for stepwise rotation of said cover plate with said grain filling chute sequentially in alignment with said grain outlet apertures, wherein said cover plate includes an air inlet aperture and further including an evacuation chute having an inlet end coupled to said inlet aperture of said plate and an outlet end coupled to air moving means and said floor includes a plurality of air inlet apertures formed in a ring in alignment with said grain outlet apertures such that said inlet aperture of said cover plate selectively aligns with an air inlet aperture of said floor permitting air to be simultaneously evacuated from a storage bin coupled to said air inlet aperture of said floor as a storage bin is filled.

2. A rotary grain distributor comprising:
a housing including a conical shell with a grain inlet at the top, an air outlet and a floor including a plurality of grain inlet apertures and air inlet apertures formed therethrough in spaced rings;
an annular cover plate including an outlet aperture and an inlet aperture;
means supporting said plate in said housing adjacent said floor for rotation with respect to said floor such that said apertures in said cover plate selectively align with a pair of grain outlet and air inlet apertures of said floor while covering the remaining pairs of apertures in said floor;
means for rotating said plate to selectively align said apertures therein with a desired pair of apertures in said floor; and
a grain filling chute extending between said grain inlet and said grain outlet aperture in said plate and an evacuation chute extending from said air inlet aperture in said plate to said air outlet.

3. The apparatus as defined in claim 2 wherein said means for rotating said plate comprises a plurality of ratchet plates coupled to said plate at equally spaced intervals corresponding to the angular position of said grain outlet apertures and a carriage movably coupled to said housing and including a pivoted pawl for engaging a ratchet plate for movement of said cover plate in one direction and cylinder means coupled to said carriage for advancing and retracting said carriage for stepwise rotation of said cover plate with said grain filling chute sequentially in alignment with successive ones of said grain outlet apertures.

4. The apparatus as defined in claim 3 including guide means on said housing extending for guidably supporting said carriage, said carriage including rollers engaging said guide means for supporting said carriage for reciprocal motion along said guide means.

5. In a rotary distributor including a grain filling chute coupling a grain inlet to one of a plurality of selectable grain outlets each associated with a storage bin and support means for rotatably supporting said filling chute, an improved drive means for stepwise advancing said chute into accurate alignment with a desired grain outlet comprising:
 - a cover plate coupled to said grain filling chute to selectively cover the grain outlets of the distributor;
 - a plurality of ratchet plates positioned on said cover plate at equally spaced intervals corresponding to the angular position of said grain outlet apertures;
 - a carriage movably coupled to said housing and including a pivoted pawl for engaging a ratchet plate for movement of said cover plate in one direction and further including guide means on said housing extending for guidably supporting said carriage, said carriage including rollers engaging said guide means for supporting said carriage for reciprocal motion along said guide means; and
 - cylinder means coupled to said carriage for advancing and retracting said carriage for stepwise rotation of said cover plate with said grain filling chute sequentially in alignment with said grain outlet apertures.

6. A rotary grain distributor comprising:
 - a housing including a conical shell with a grain inlet at the top, an air outlet and a floor including a plurality of grain inlet apertures and air inlet apertures formed therethrough in spaced rings;
 - an annular cover plate including an outlet aperture and an inlet aperture;
 - means supporting said plate in said housing adjacent said floor for rotation with respect to said floor such that said apertures in said cover plate selectively align with a pair of grain outlet and air inlet apertures of said floor while covering the remaining pairs of apertures in said floor;
 - means for rotating said plate to selectively align said apertures therein with a desired pair of apertures in said floor wherein said means for rotatably supporting said plate includes a plurality of alignment rollers mounted to said housing to engage a side of said plate and a rotatable vertically extending shaft coupled to said plate for supporting said plate; and
 - a grain filling chute extending between said grain inlet and said grain outlet aperture in said plate and an evacuation chute extending from said air inlet aperture in said plate to said air outlet.

* * * * *